Nov. 28, 1961   J. SHANKS   3,010,532
ELECTRIC IGNITION DISTRIBUTOR DISINTEGRATER
Filed Oct. 16, 1959

INVENTOR.
John Shanks
BY Victor J. Evans & Co.
ATTORNEYS

United States Patent Office 3,010,532
Patented Nov. 28, 1961

3,010,532
ELECTRIC IGNITION DISTRIBUTOR DISINTEGRATOR
John Shanks, 58 Schoeman St., Pretoria, Transvaal, Union of South Africa
Filed Oct. 16, 1959, Ser. No. 846,889
2 Claims. (Cl. 180—82)

This invention relates to safety attachments for motor vehicles, particularly where vehicles carry large sums of money, and in particular a blank cartridge positioned on a distributor or carburettor and connected to a button on an instrument panel or within easy reach of the foot of an operator of a vehicle whereby when subjected to a hold-up the operator presses the button firing the cartridge which, in producing a loud noise, scares away the hold-up men and, at the same time, disintegrates the distributor or carburettor, thereby making the vehicle inoperative.

The purpose of this invention is to provide means whereby a vehicle is made inoperative to prevent gunmen in a hold-up escaping with money and valuabes in the vehicle.

Various types of safety attachments have been provided for motor vehicles in which payrolls and valuables are carried. However, payrolls and valuables are usually carried in a small satchel and by forcing the driver of a vehicle in which the payroll or valuables are positioned to drive to a remote point or to a waiting vehicle, the satchel containing the payroll and valuables is readily removed and carried away.

With this thought in mind this invention contemplates a blank cartridge mounted in a plate positioned over the terminal bosses of the cap of a distributor or in a carburettor pad and connected to a button positioned within easy reach of the operator of the vehicle wherein, in the event of a hold-up, the operator may press the button and disintegrate the carburetor or distributor, making the vehicle inoperative.

The object of this invention is, therefore, to provide means for making a vehicle inoperative in the event of a hold-up.

Another object of the invention is to provide means for blowing up the distributor or carburettor of a motor vehicle by an operator of a vehicle in the event of a hold-up in which the device is actuated without apparent movement of the operator.

Another important object of the invention is to provide an attachment for producing a loud noise and making an engine of a motor vehicle inoperative in which the attachment may be installed on vehicles now in use.

A further object of the invention is to provide an attachment for an engine of a motor vehicle by which the vehicle is made inoperative, and which also produces a sound, in which the attachment is of a simple and economical construction.

With these and other objects and advantages in view the invention embodies a plate formed in two semi-circular sections positioned over the bosses of terminals of a distributor cap and having extensions at one side, a blank cartridge mounted in the extensions of the sections of the plate, a button designed to be mounted in a motor vehicle and within easy reach of an operator of the vehicle, means for firing the cartridge and disintegrating the distributor, or the carburettor, of the vehicle, and means for locking a satchel containing money, such as a payroll, or valuables to the floor of the vehicle.

Other features and advantages of the invention will appear from the following description taken in connection with the drawings, wherein.

Figure 1:
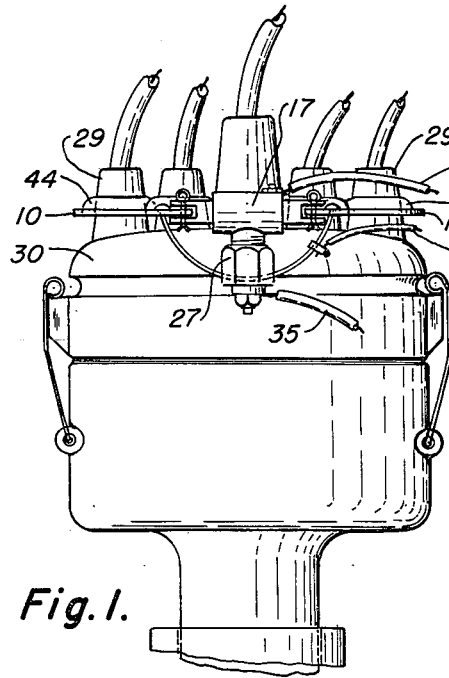
FIGURE 1 is a side elevational view of a distributor of a motor vehicle showing the attachment of this invention positioned thereon.
Figure 2:
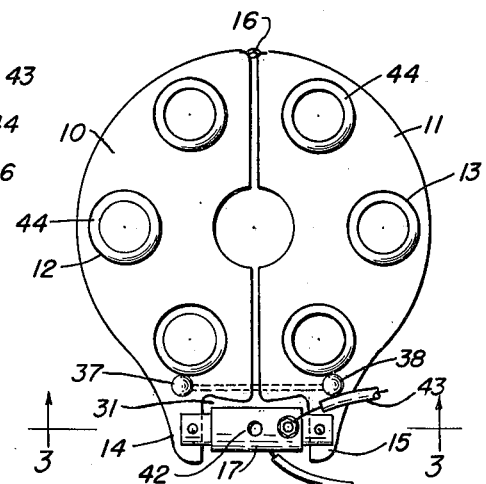
FIGURE 2 is a plan view of a plate having a blank cartridge therein designed to be positioned over the terminal bosses of a distributor cap.

Referring now to the drawing wherein like reference characters denote corresponding parts the disintegrator of the distributor or carburettor of a motor vehicle includes substantially semi-circular complementary plates 10 and 11 having terminal boss receiving openings 12 and 13 therein and having tongues 14 and 15 extended from one side, the plates being welded together at the point 16, a T 17 having cylinders 18 and 19 in each end and a threaded nipple 20 extended from one side, pistons 21 and 22 positioned in the cylinders and connected by cotter pins 23 and 24 to the plates 10 and 11 respectively, a cylinder 25 having a blank cartridge 26 therein extended through the nipple 20, and a cap 27 threaded on the nipple and having a firing plug 28 therein. The blank cartridge 26 is equipped with a primer, not shown, that when subjected to the intense heat, such as a short or otherwise in the wiring circuit of a motor vehicle, will ignite the powder contained in the blank cartridge.

The plates 10 and 11 are positioned over terminal bosses 29 of a distributor cap 30 and the T 17 is fitted in a gap 31 between the tongues 14 and 15 with the tongues secured in slots 32 and 33 of the pistons 21 and 22 by the cotter pins.

Upon firing the blank cartridge, pressure (controlled by vent 42), resulting from the explosion in the chamber 34 drives the pistons outwardly separating the plates 10 and 11, and tearing the distributor cap apart.

The firing plug 28 is connected by a wire 35 which is in series with a button 45 that is used for actuating the safety device, and a battery 46 for the vehicle in which the operating and safety device is positioned or to any other suitable source of current that is available in the vehicle and the fitting 17 is grounded by a wire 43. The firing plug is provided with a firing element 40 as indicated by the broken lines. The firing element 40 comprises a wire that is in contact with the blank cartridge 26 so that when the firing element 40 becomes heated as will be later explained the primer in the blank cartridge 26 will be acted on to fire the powder in the blank cartridge 26.

Figure 3:
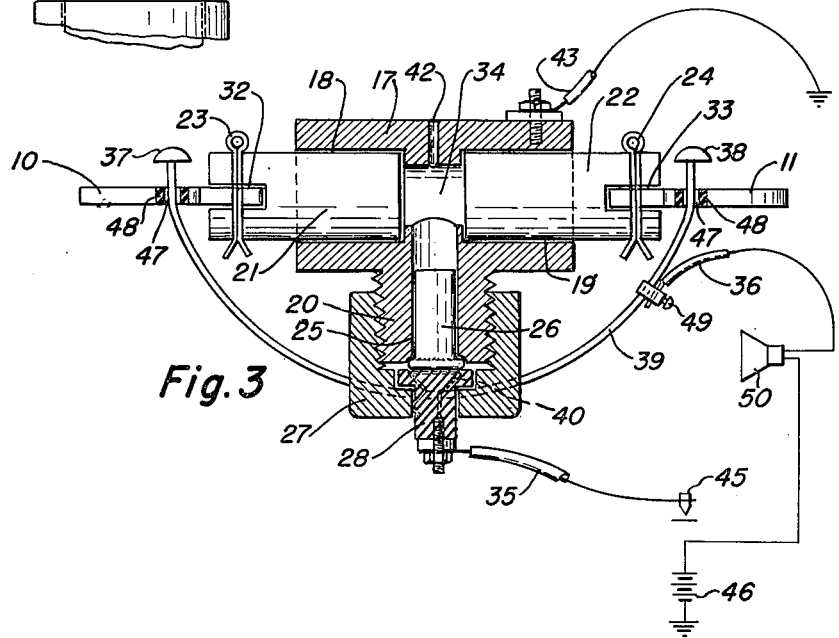
FIGURE 3 is a longitudinal section taken on line 3—3 of FIGURE 2, and with the parts shown on an enlarged scale, showing a fitting, and associated parts, in which a blank cartridge is mounted.

The plates 10 and 11 are each provided with an opening 47 in which is positioned an insulating member 48. Large headed contact pins 37 and 38 are mounted for slightly restricted sliding motion in the insulating member 48 and an insulated wire 39 is connected to the ends of the contact pins 37 and 38 as shown in FIGURE 3. The wire 39 extends between the plates 10 and 11 and a binding post 49 connects a wire 36 thereto. The wire 36 is connected to the horn 50 of the vehicle so that the safety device not only produces a loud noise as the cartridge is fired, but also causes the horn to sound continuously through grounding of the contact pins 37 and 38, by disintegration of the distributor cap 30 as will be later explained.

The fitting or T 17 is formed of non-ferrous conductive metal and insulating washers 44 are positioned around the openings to keep the plates 10 and 11 in position and to space the safety device from the distributor cap 30. Since it is essential that a ground be maintained between the pistons 21 and 22 and the T 17, the wire 39 that is attached to the plates 10 and 11 by means of contact pins 37 and 38 must possess sufficient strength to prevent the wire 39 from being broken or the contact pins 37 and 38 being disconnected from the plates 10 and 11. The wire 39 must also be of a sufficient length that at least one of the pistons 21 or 22 maintain contact with the T 17 so that a proper ground for the sounding of the horn is available at all times. Therefore even though the distributor cap 30 may be destroyed so that the automobile to which the device is attached will not be able to operate, the disintegration of the entire unit is not accomplished by the explosion of the blank cartridge as previously set forth so that a complete ground for the device is not lost at anytime during the operation thereof.

As previously stated the safety device is to be actuated when the operator of the motor vehicle in which the safety device is installed is in danger of being held up. By applying pressure to the button 45 either by hand or foot current from the battery 46 is fed into the firing element 40 to cause the heating of the wire thereof, by grounding of the curent wire 35 through firing plugs 28, blank cartridge 26, T 17, and ground wire 43. The heated wire will cause the primer in the blank cartridge 26 to ignite and fire the powder therein. The force of the explosion of the powder in the blank cartridge 26 will be confined in the chamber 34 of the T 17 causing the pressure created thereby to move the pistons 21 and 22 outwardly of the cylinders 18 and 19. Since the pistons 21 and 22 are connected by cotter pins 23 and 24 to the plates 10 and 11, the plates 10 and 11 will be forced apart disintegrating the distributor cap 30. The vent 42 to the chamber 34, however, permits some of the pressure created by the explosion to be vented to the atmosphere, so that the movement of the pistons 21 and 22 is not too violent so as to otherwise damage the vehicle. As the plates 10 and 11 are moved apart the wire 39 will bend moving the contact pins 37 and 38 toward the plates 10 and 11, until contact of the contact pins 37 and 38 with the plates 10 and 11 will close the circuit to the horn 50 for the sounding thereof. Thus the safety device disables the vehicle to which it is attached until the damage created by the safety device has been repaired.

In transporting a payroll or other valuables the payroll or valuables are placed in a container and the container is locked to the floor of the vehicle. A guard at a bank places articles in the container and locks the container with a key, retaining the key. The guard also locks the container to the floor of the vehicle and retains this key also. Upon arriving at an office or plant an officer having duplicate keys removes and opens the container.

Should an unauthorised party force his way into the vehicle, it is impossible for the operator to deliver the money or valuables, and should the party attempt to drive the vehicle the former operator presses the button, firing the cartridge and actuating the horn.

To repair the vehicle, it is only necessary to install a new distributor or carburettor, in the event the cartridge is installed on a carburettor of a vehicle.

It will be understood that modifications within the scope of the appended claims may be made in the design and arrangement of the parts without departing from the spirit of the invention.

What is claimed is:

1. A motor vehicle protector comprising a pair of complementary semi-circular plates, said plates having openings therein and said openings being positioned to receive the bosses of the terminals of a distributor cap, said plates being secured together at one side and having spaced tongues extended from the opposite side, a fitting having cylinders in opposite ends thereof positioned between the tongues of the plates, pistons in the cylinders and connected to the tongues of the plates, a cartridge positioned in the fitting and mounted between the cylinders, and means for firing the cartridge from a remote point whereby the force of the explosion drives the pistons outwardly destroying the distributor cap.

2. In a motor vehicle safety attachment, the combination which comprises a pair of substantially semi-circular complementary plates having openings therethrough and having tongues extended from one side, said openings of the plates being positioned to receive terminal bosses of a distributor cap, insulating washers positioned in the openings of the plates, a linking wire with a connection to the horn of the vehicle incorporated, a T having cylinders in opposite ends and a threaded nipple extended from one side positioned between the tongues of the plates, pistons in the cylinders and connected to the tongues, a cartridge positioned in the threaded nipple, a firing plug positioned at the firing end of the cartridge, a ground extended from the T and a wire extended from the firing plug for firing the cartridge.

References Cited in the file of this patent

UNITED STATES PATENTS

| | | |
|---|---|---|
| 2,306,358 | Kimsey et al. | Dec. 22, 1942 |
| 2,489,984 | Shoemaker | Nov. 29, 1949 |
| 2,717,042 | Grant et al. | Sept. 6, 1955 |
| 2,865,584 | Holloway | Dec. 23, 1958 |